United States Patent [19]

Yasukawa

[11] Patent Number: 4,754,663
[45] Date of Patent: Jul. 5, 1988

[54] ARTICULATION STRUCTURE OF ROTATABLE ARM

[75] Inventor: Kazuyoshi Yasukawa, Nagano, Japan

[73] Assignee: Kabushiki Kaisha Sankyo Seiki Seisakusho, Nagano, Japan

[21] Appl. No.: 905,428

[22] Filed: Sep. 10, 1986

[30] Foreign Application Priority Data

Sep. 10, 1985 [JP] Japan ................... 60-200098

[51] Int. Cl.⁴ ............................................ F16H 37/06
[52] U.S. Cl. .................... 74/665 L; 901/23; 901/21; 901/19
[58] Field of Search .......................... 74/665 L, 665 P; 901/19, 23, 25, 47, 9

[56] References Cited

U.S. PATENT DOCUMENTS

| 4,062,601 | 12/1977 | Pardo et al. | 901/19 X |
| 4,557,662 | 12/1985 | Terauchi | 901/23 X |
| 4,600,355 | 7/1986 | Johnson | 901/9 X |
| 4,610,598 | 9/1986 | Hamada et al. | 901/21 X |
| 4,620,830 | 11/1986 | Tsuchihasi et al. | 901/23 X |
| 4,637,771 | 1/1987 | Yasukawa | 901/21 X |

FOREIGN PATENT DOCUMENTS 0188863 7/1986 European Pat. Off. .............. 901/23
7593 1/1984 Japan .

Primary Examiner—Dirk Wright
Attorney, Agent, or Firm—Sughrue, Mion, Zinn, Macpeak, and Seas

[57] ABSTRACT

A first rotatable arm and a second arm rotatably are connected together at a forward end of the first rotatable arm. A hollow hole portion is formed at a rear end portion of the second arm and has a hollow projecting shaft provided at one side coaxial with it. A supporting plate and a second shaft are provided at the forward end of the first arm for rotatably supporting the hollow projecting shaft and the hollow hole portion, respectively, the supporting plate and the second shaft being separated so as to be on opposite sides of the hole portion. A rotary shaft rotatably is supported by the hollow projecting shaft at a center of the latter and a motor is provided in a position separated from the rotary shaft and connected to it. A decelerator is provided between the rotary shaft and the second arm within the hollow hole portion.

7 Claims, 2 Drawing Sheets

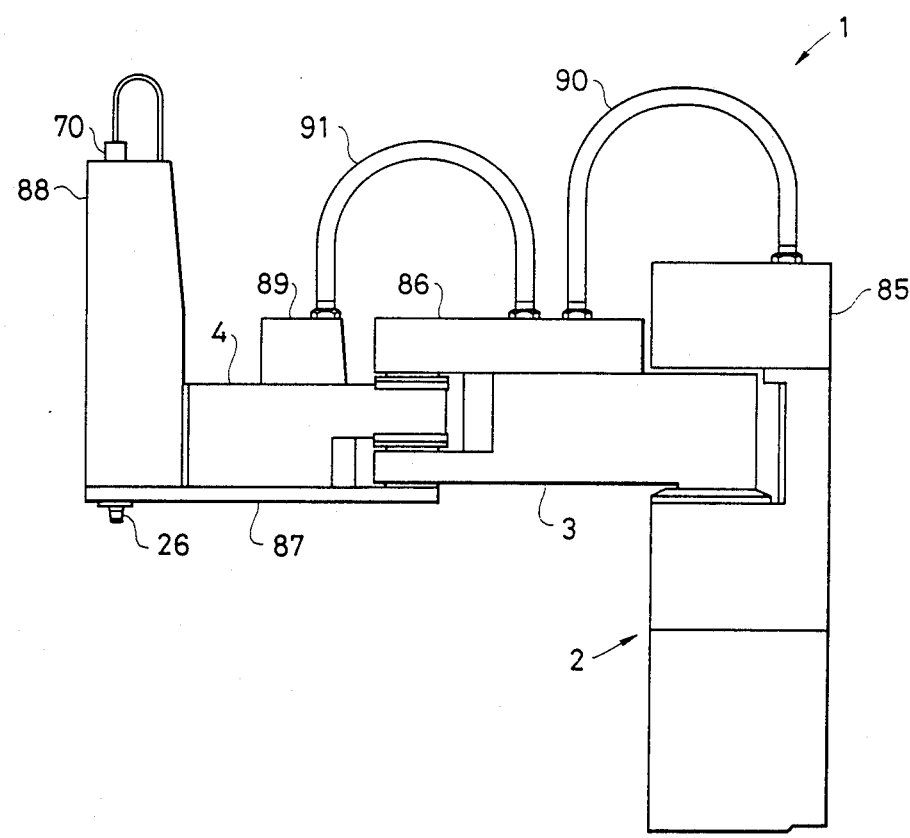
FIG. 1
FIG. 3
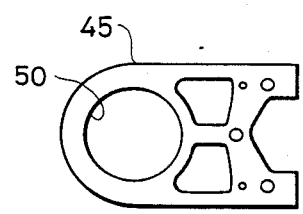

ARTICULATION STRUCTURE OF ROTATABLE ARM

BACKGROUND OF THE INVENTION

The present invention generally relates to an industrial articulated robot, and more particularly relates to a structure of an articulated portion of rotatable arms.

Generally, in an articulated robot of this kind, a plurality of arms are rotatably supported in a linked manner on a base portion as a means for transmitting a driving force. The the driving sources are disposed separately from the base portion of the robot. When the arms perform their turning movements, the motors become loads for the rotational movements causing great inertia force. Therefore it is difficult to accurately position the robot arms additionally, in order to prevent the robot from falling down forward, sufficient stiffness is required for the attaching portion of the base portion of the robot.

For example, Japanese Patent Unexamined Publication No. 7593/84 discloses an arrangement in which an arm driving motor is fixed on a base and the rotation of the motor is transmitted to articulated portions through transmission means constituted by, a belt and pulleys. Harmonic decelerators are incorporated in the respective articulated portions so as to decelerate rotation of the motor resulting in a deceleration of the arms.

The articulated portions of the arms are supported in a state of a cantilever, so that the attitude of the arms becomes unstable during deceleration. Therefore, the arms have a tendency to fall in the forward direction. In addition, it becomes difficult to attach rotary position sensors due to the manner in which the arms are connected. Further, since the driving motor is attached to the fixed base, the rotation transmission mechanism becomes complex thereby making it difficult to attach other driving source, such as a driving motor for a work shaft provided at the forward end of the arm, onto a portion of the fixed base.

OBJECT AND SUMMARY OF THE INVENTION

It is therefore an object of the present invention to reduce inertia at articulated portions of a robot and to increase stiffness at connecting portions of the articulated arms. An additional thereby object is to simplify the structure, and increase the operating speed as well as the positioning accuracy.

According to the present invention, therefore, a supporting plate and a projecting shaft portion are provided in opposition to each other at a forward end portion of a first arm so as to support a second arm to be linked with the first arm; a hollow shaft portion formed at a rear end of the second arm is rotatably connected between the supporting plate and the projecting shaft portion; and a speed reducer or decelerator is incorporated in the inside of the hollow portion, the output side of the decelerator being connected to the second arm, and the input side of the decelerator being rotatably supported on the supporting plate so as to take-in rotation force supplied, for example, by a driving source provided at the first arm. Further, according to the present invention, a detecting plate is attached on the first arm at the articulated portion and the rotary position of the detecting plate is detected by a sensor provided on the first arm to thereby directly detect the angle of rotation of the arm.

BRIEF DESCRIPTION OF THE DRAWINGS

FIG. 1 is a side view showing the articulated robot;
FIG. 3 is an enlarged plan view of the supporting plate.

DETAILED DESCRIPTION OF THE PREFERRED EMBODIMENTS

Figure 2:
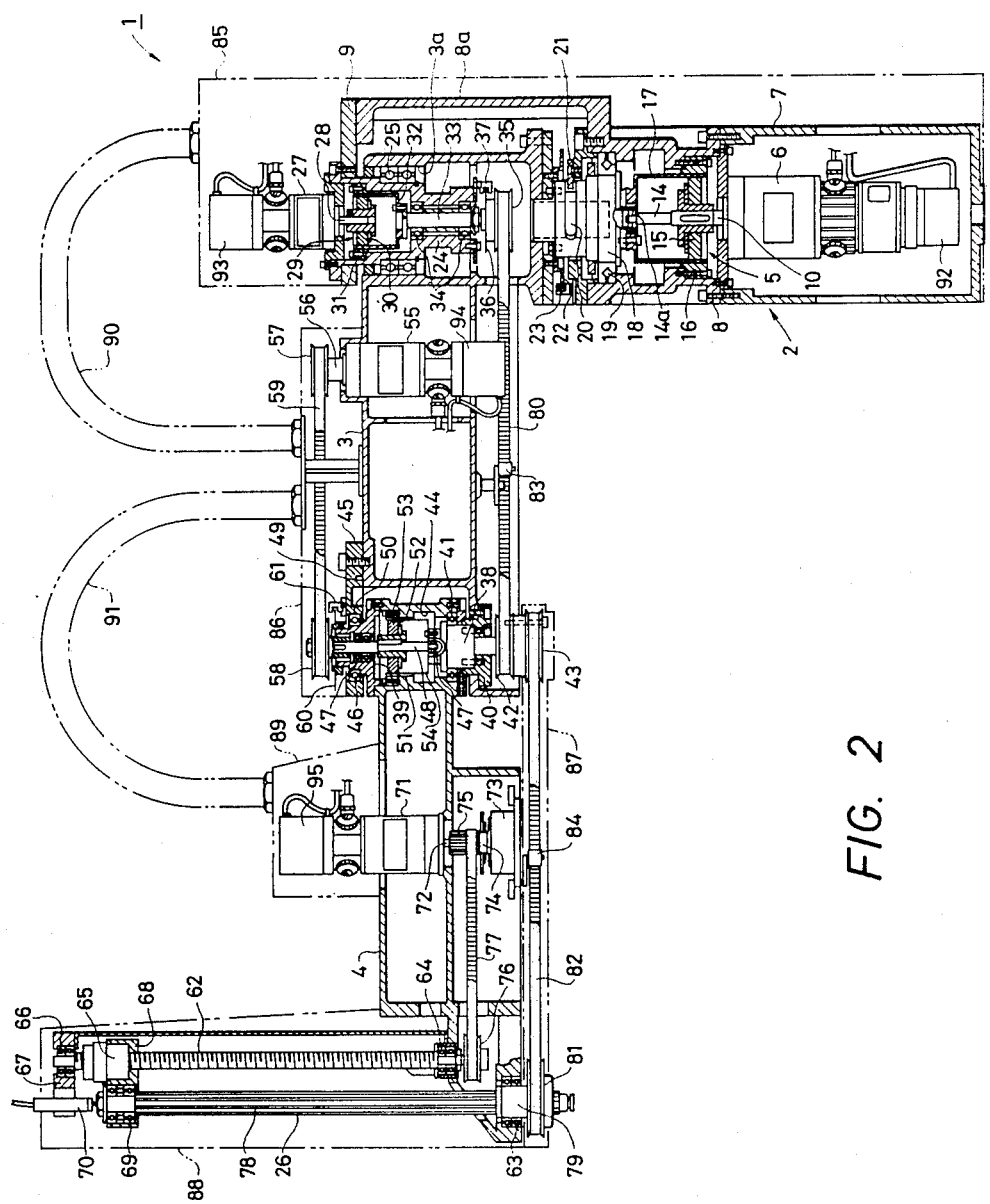
FIG. 2 is an enlarged cross section showing the inside portion of the articulated robot.

FIG. 1 shows the whole arrangement of an articulated robot 1. The articulated robot 1 is provided with a base 2 to be attached to a mounting position, a first arm 3 supported on the base 2 so as to be rotatable about a vertical axial line, and a second arm 4 connected at its rear end portion to the first arm 3 at the forward end portion of the latter so as to be rotatable about another perpendicular axial line.

FIG. 2 shows an interior arrangement of the articulated robot 1.

The base 2 is arranged so as to have a U-shape when viewed from its side and integrally assembly by three members, that is, a base frame 7, a machinery frame 8, and a holding frame 9. The base frame 7 has a cup-like shape so as to accommodate a driving motor 6 in an inner space thereof. The machinery frame 8 is made hollow so as to accommodate in its inside a harmonic drive type speed reducer or decelerator 5 and to hold the driving motor 6 at its lower end. An output shaft 10 of the motor is coupled with an input shaft 14 of the decelerator 5. The rotation of the input shaft 14 is transmitted with a large deceleration ratio to an output side flexspline 17 disposed between a wave generator 15 and a circular spline 16 fixed to the machinery frame 8. Further, the input shaft 14 is rotatable supported by a bearing 14a. The harmonic mechanism for the reducer 5 is well known in the art.

On the other hand the first arm 3 is supported rotatably relative to the base 2, that is, on the base frame 7, at its rear end lower side portion by a first shaft 18 through a bearing 19, the first shaft 18 being attached at the rotation center of the first arm 3. The first shaft 18 is coupled with the output side flexspline 17 and arranged to rotatably support the input shaft 14 at the central portion of the first shaft 18. A groove 20 is circumferentially formed in the outer peripheral surface of the first shaft 18 within a range of a rotary angle of the first arm 3, and the rotation range of the first arm 3 is restricted by the relationship of abutment between the groove 20 and an abutting member 21 attached to the upper surface of the machinery frame 8. The rotation angle of the first arm 3 is detected electrically by a rotary plate 22 attached on the lower surface of the first arm 3 and a sensor 23 attached on the upper surface of the machinery frame 8.

The holding frame 9 is fixed on a supporting member 8a of the machinery frame 8 and arranged to fix a hollow shaft 24 and a motor 27 for driving a work shaft 26 coaxially with the first shaft 18. The hollow shaft 24 is disposed to face the inside of the rear portion of the first arm 3 and arranged to support a bearing hole 3a at a rear end upper portion of the first arm 3 through a bearing 25. As a result, the first arm 3 is rotatably supported in a so-called double held state, that is, rotatably supported on the machinery frame 8 by the first shaft 18 and on the holding frame 9 by the hollow shaft 24 coaxial with the shaft 18, the lower and upper portions of the first arm 3 respectively. The hollow shaft 24 accommodates in its inside a harmonic drive type decelerator 29. The rotation of an output shaft 28 of the motor 27 is applied to a wave generator 30 of the decelerator 29, transmitted in turn to a flexspline 32 between the wave generator 30 and a circular spline 31 fixed on the hollow shaft 24, and then transmitted to an output side rotary shaft 33. The rotary shaft 33 is rotatably supported by a pair of bearings 34 at the lower portion of the hollow shaft 24 and partly projected from the hollow shaft 24 so as to hold a pulley 35 and a sensor plate 36 by the projecting portion of the rotatry shaft 33. The sensor plate 36 is provided for detecting the quantity of rotation of the work shaft 26, correspondingly to a sensor 37 attached on the hollow shaft 24.

The second arm 4 is rotatably supported at its rear end portion by the first arm 3 at its forward end portion through a second shaft 38 and a hollow projecting shaft 39. That is, the second shaft 38 is fixed to the forward lower side portion of the first arm 3 through an attaching seat 40 so as to be rotatable through bearings 41 relative to a hollow hole portion 44 at the rear end of the second arm 4. The second shaft 38 rotatably supports at its lower end portion a pair of relay pulleys 42 and 43. The hollow projecting shaft 39 is fixed to the second arm 4 at the upper surface of the hollow hole portion 44 of the second arm 4 so as to be rotatable through a bearing 46 relative to a supporting plate 45 fixed to the first arm 3 side. The hollow projecting shaft 39 holds a rotary shaft 48 rotatably and coaxially with the second shaft 38 through an upper and a lower bearings 47 in the inside of the hollow hole 44. The supporting plate 45 is attached on the upper surface of the forward end side portion of the first arm 3 in a correctly positioned state owing to the fitting of the positioning pins 49 or the like, and holds the bearing 46 by a bearing housing portion 50 of the plate 45 as shown in FIG. 3. The second arm 4 accommodates a harmonic drive type decelerator 51 in the inside of the hollow hole 44. The decelerator 51 transmits the rotation of the rotary shaft 48 acting as an input shaft to the second arm 4 with a large deceleration ratio through an input side wave generator 52, an output side circular spline 53 fixed to the hollow hole portion 44, and a fixed side flexspline 54. The driving source for the second arm 4 is, for example, a motor 55 attached to the first arm 3 at its midway. The rotation of an output shaft 56 of the motor 55 is transmitted to the rotary shaft 48 through pulleys 57 and 58, and a belt 59. A disk-like position detecting plate 60 is attached at the upper end portion of the hollow projecting shaft 39, and a sensor 61 is attached to the supporting plate 45 correspondingly to the detecting plate 60.

Next, the second arm 4 rotatably supports at its forward portion the vertical work shaft 26 and a feed screw 62 disposed in parallel to the work shaft 26, through bearings 63 and 64 respectively. The feed screw 62 makes up at its screw portion a screw pair together with a feed nut 65 and is rotatably supported at is upper end portion by a supporting bracket 67 through a bearing 66, the bracket 67 being attached on the upper surface of the second arm 4. The feed nut 65 is linked with the work shaft 26 at its upper end portion through a connector 68 and a bearing 69 provided inside the connector 68 so as to allow the work shaft 26 to rotate. A rotary joint 70 is attached at the upper portion of the work shaft 26 so as to drive an air chuck or the like.

A driving motor 71 for driving the feed screw 62 is attached at substantially the middle portion of the second arm 4, and the rotation of the output shaft 72 of the motor 71 is applied as an input to a harmonic drive type decelerator 73, and transmitted to the feed screw 62 through a hollow output shaft 74 of the decelerator 73, pulleys 75 and 76, and a belt 77. The work shaft 26 is supported by a spline 78 axially movably relative to a spline cylinder 79 so as to receive only rotation, and arranged to hold a working member such as an air chuck or the like at the lower end portion of the work shaft 26. The rotation of the rotary shaft 33 is transmitted to the work shaft 26 successively through an endless belt 80 entrained between the pulleys 35 and 42, and an endless belt 82 entrained between the pulley 43 and a pulley 81 attached on the lower end of the spline tube 79. Pulleys 83 and 84 for adjusting tension are provided at the respective middle portions of the belts 80 and 82.

The feed screw 62, the belts 59 and 82, the work shaft 26, the feed screw 62, and the motor 71 are respectively covered with covers 85, 86, 87, 88 and 89. The wirings for the motors 55 and 71 are effected by wires passed through flexible tubes 90 and 91 disposed respectively between covers 85 and 86, and between 86 and 89. The flexible tubes 90 and 91 are used also for the wirings for leading the outputs from the sensor 61, etc., to the base 2 side. The motors 6, 27, 55 and 71 are of the type in which the quantity of rotation can be controlled and therefore connected with encoders 92, 93, 94 and 95.

The articulated robot 1 is installed in a working position at the portion of the base 2 so as to perform necessary work owing to the turning movement of the first arm 3 and the second arm 4, and the up/down and rotational movements of the work shaft 26. That is, as the driving motor 6 rotates, the rotation thereof is transmitted to the first shaft 18 after decelerated by the decelerator 5, so that the first arm 3 is driven by the first shaft 18 to perform the turning movement about the axial line of the first shaft 18 and the hollow shaft 24. The turning movement of the second arm 4 is given by the motor 55. That is, the rotation of the motor 55 is given to the rotary shaft 48, decelerated by the decelerator 51, and then transmitted to the output side circular spline 53, so that the second arm 4 performs the turning movement relative to the first arm 3 about the first shaft 38 and the hollow projecting shaft 39 disposed lower and upper portions respectively. The work shaft 26 is positioned at a predetermined position within the operative range owing to the respective turning movements of the first and second arms 3 and 4.

On the other hand, the rotation of the work shaft 26 is given by the motor 27. That is, after decelerated by the decelerator 29, the rotation of the motor 27 is transmitted to the work shaft 26 through the output side rotary shaft 33, the belts 80 and 82, and the spline tube 79. The up/down movement of the work shaft 26 is caused by the motor 71. The rotation of the motor 71 is transmitted to the feed screw 62 through the belt 77, and the feed nut 65 moves up or down in the axial direction of the feed screw 62 depending on the rotating direction of the latter. Thus, the work shaft 26 performs necesssary work while performing the up/down and rotating movements. During those movements the rotation is stable and performed smoothly to thereby make it possible to perform positioning under highly accurate control because each of the first and second arms 3 and 4 is supported at its upper and lower portions, that is, in a double supporting state.

Here, the turning movement of the first arm 3 is independent of the rotating movement of the output shaft 33, so that if the motor 27 is stopping, the direction of the work shaft 26 relative to the installed position does not change even if the first arm 3 performs its turning movement. This is because the pulleys 35, 42, 43 and 81 are the same in size with each other, and the belts 80 and 81 are combined with those pulleys in the state of a parallelogram, so as to form a parallel movement mechanism. The endless belts 80 and 82 may be loosened by the adjustment of the attaching positions of the pulleys 83 and 84, so as to make the belts come off downward easily.

The respective quantities of the above-mentioned turning movements and the original positions are detected by the sensors 23, 37 and 61. When over-run must be detected, an additional sensor is provided.

Since the foregoing arrangement is a specific embodiment according to the present invention, the relationship among the parts may be made different from that illustrated in the drawings. For example, the motor 6 may be provided side by side with the first shaft 18 to thereby reduce the height of the base 2. The motor 55 is not limited to be disposed at the middle portion of the first arm 3, but may be attached, for example, at a portion of the holding frme 9 of the base 2. In this case, a coaxial intermediate shaft is disposed at a portion of the rotary shaft 33 for the transmission of the rotation of the motor shaft 56.

The rotary plate 22, the sensor plate 36, the position detecting plate 60, etc., may be constituted by a slit plate, a cam plate, or the like. The relationship between the above-mentioned plates and the sensors 23, 37 and 61 are not limited to so-called contactless switches, but other types of means may be used alternatively.

According to the present invention, the following effects can be obtained.

First, since the rear end portion of the second arm is supported on the forward end portion of the first arm in a so-called double-supporting state through the second shaft and the hollow projecting shaft, the stiffness at the articulated portion is made high and highly accurate positioning can be made sure owing to the smooth rotation of the second arm.

Since the motors as driving sources can be attached onto the base 2 separately from the articulated portion between the first and second arms, the weight of the articulated portion can be displaced toward the base 2, so that the inertia during the turning movements becomes small so as to make the speed of movement higher correspondingly, and that the accuracy of positioning can be made high in a stopping operation.

Further, since the decelerator is accommodated in the hollow hole portion of the second arm, the rotation transmission system at the articulated portion is made common to each of the turning shafts of the respective arms, so that the shafts can be arranged coaxially with each other, to thereby make it possible to arrange the supporting structure of the articulated portion and the rotation transmission system in a rotational manner to make the mechanism simple.

The articulation structure is not limited to the first and second arms but effective as an articulation between any two arms.

I claim:

1. An articulation structure of the type including first and second arms rotatable in a horizontal plane, said second arm being rotatably supported at a forward end of said first arm, comprising:
   a first rotatable arm;
   a second arm rotatably connected to said first arm at a forward end of the latter;
   a hollow hole portion formed at a rear end portion of said second arm and having a first axis;
   a hollow projecting shaft provided at one side of said hollow hole portion and coaxial with said hollow hole portion;
   a supporting plate and a second shaft provided at the forward end of said first arm for rotatably supporting said hollow projecting shaft and said hollow hole portion respectively, said supporting plate and said second shaft being separated so as to be on opposite sides of the hollow hole portion;
   a rotary shaft rotatably supported by said hollow projecting shaft at a center of the latter;
   a driving source provided in a position separated from said rotary shaft and connected to said rotary shaft; and
   a decelerator provided between said rotary shaft and said second arm.

2. An articulation structure of rotatable arms according to claim 1, in which said decelerator is provided in said hollow hole portion of said second arm and interposed between said rotary shaft and said second arm.

3. An articulation structure of roatatble arms according to claim 2 in which said decelerator is a harmonic decelerator, and in which a wave generator, a flexspline, and a circular spline are fixed to said rotary shaft, said second shaft, and said hollow hole portion respectively.

4. An articulation structure of rotatable arms according to claim 1, in which a first pulley is fixed to said rotary shaft and a second pulley is fixed to an output shaft of a driving motor supported in said first arm for driving said second arm, said first and second pulleys being coupled with each other through a belt.

5. An articulation structure of rotatable arms according to claim 1, in which a detecting plate and a sensor are attached to said hollow projecting shaft and to said supporting plate respectively so as to detect a quantity of rotation of said second arm.

6. An articulation structure of rotatable arms according to claim 5, in which slits are circumferentially equidistantly formed in said detecting plate, and in which said sensor is a photosensor.

7. An articulation structure of rotatable arms according to claim 1, in which a relay pulley is rotatably supported under said second shaft.

* * * * *